United States Patent
Flake

(10) Patent No.: US 9,430,583 B1
(45) Date of Patent: Aug. 30, 2016

(54) EXTRACTING A PORTION OF A DOCUMENT, SUCH AS A WEB PAGE

(75) Inventor: Gary W. Flake, Bellevue, WA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 13/158,343

(22) Filed: Jun. 10, 2011

(51) Int. Cl.
G06F 17/30 (2006.01)

(52) U.S. Cl.
CPC ..... *G06F 17/3092* (2013.01); *G06F 17/30905* (2013.01)

(58) Field of Classification Search
CPC ............... G07F 17/3092; G07F 17/30905
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff | |
| 6,216,135 B1 | 4/2001 | Brodersen et al. | |
| 6,233,617 B1 | 5/2001 | Rothwein et al. | |
| 6,236,978 B1 | 5/2001 | Tuzhilin | |
| 6,266,669 B1 | 7/2001 | Brodersen et al. | |
| 6,288,717 B1 | 9/2001 | Dunkle | |

(Continued)

FOREIGN PATENT DOCUMENTS

WO WO 9844402 A1 * 10/1998
WO WO 0217162 A2 * 2/2002

OTHER PUBLICATIONS

Microsoft, "Control the formatting when you paste text", Office Support, retrieved on Mar. 17, 2014, retrieved from the Internet <URL: http://office.microsoft.com/en-us/word-help/control-the-formatting-when-you-paste-text-HA010215708.aspx>.*

(Continued)

*Primary Examiner* — Tyler Torgrimson
(74) *Attorney, Agent, or Firm* — Weaver Austin Villeneuve & Sampson LLP

(57) ABSTRACT

A portion data structure representing a portion extracted from a formatted source document is described. A portion data structure contains a first subtree of nodes that is modeled after a second subtree of a complete hierarchical representation of the formatted source document. Explicit formatting attribute values are specified for nodes of the first subtree only where a value calculated for the formatting attribute in a node of the first subtree differs from a value calculated for the formatting attribute in the corresponding node in the second subtree at a time when the node of the first subtree descends from a reset node specifying standardized formatting attribute values. The contents of the portion data structure are usable to display the portion extracted from the formatted source document in a context other than the formatted source document.

31 Claims, 15 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,360,166 B1 * | 4/2008 | Krzanowski .............. 715/767 |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,562,287 B1 * | 7/2009 | Goldstein et al. ............ 715/201 |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0022115 A1 * | 1/2005 | Baumgartner et al. ........ 715/513 |
| 2005/0050555 A1 | 3/2005 | Exley et al. |
| 2005/0091098 A1 | 4/2005 | Brodersen et al. |
| 2007/0266342 A1 * | 11/2007 | Chang et al. .................. 715/810 |
| 2008/0168345 A1 * | 7/2008 | Becker .......................... 715/242 |
| 2008/0243910 A1 * | 10/2008 | Meadows ...................... 707/102 |
| 2008/0249972 A1 | 10/2008 | Dillon |
| 2008/0307301 A1 * | 12/2008 | Decker et al. ................. 715/241 |
| 2009/0063415 A1 | 3/2009 | Chatfield et al. |
| 2009/0083300 A1 * | 3/2009 | Wake et al. .................... 707/102 |
| 2009/0100342 A1 | 4/2009 | Jakobson |
| 2009/0177744 A1 | 7/2009 | Marlow et al. |
| 2009/0210780 A1 * | 8/2009 | Oshima ......................... 715/234 |

(56) References Cited

U.S. PATENT DOCUMENTS

| | | |
|---|---|---|
| 2011/0218958 A1 | 9/2011 | Warshavsky et al. |
| 2011/0247051 A1 | 10/2011 | Bulumulla et al. |
| 2012/0005429 A1* | 1/2012 | Kalasapur ......... G06F 17/30899 711/118 |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0124684 A1* | 5/2013 | Zheng ................... G06F 17/272 709/217 |
| 2013/0155463 A1* | 6/2013 | Jin ....................... G06F 17/272 358/1.15 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

* cited by examiner

FIG. 12

| user id | date/time | domain | title | compressed portion HTML |
|---|---|---|---|---|
| 5553 | 4/4/2011 10:49:13AM PDT | example.com | Clipping Example | |
| 5553 | 4/4/2011 8:39:49AM PDT | www.facebook.com | Facebook | |
| 5553 | 4/4/2011 8:37:03AM PDT | www.google.com | techcrunch – Google Search | |
| 5553 | 4/3/2011 4:12:08PM PDT | slashdot.org | Slashdot:News for Nerds, stuff that matters | |
| 5557 | 4/9/2011 2:13:22AM PDT | www.app.com | New iPod Nano released | |
| ... | | | | | portion table — 1200

US 9,430,583 B1

EXTRACTING A PORTION OF A DOCUMENT, SUCH AS A WEB PAGE

TECHNICAL FIELD

The described technology is directed to the field of tools for interacting with electronic documents.

BACKGROUND

A web browser is an application for displaying documents, such as web pages represented in HTML. Such web pages can include a wide variety of content, different portions of which are of interest to different users.

A few different conventional approaches are available to a user who wishes to retain a portion of a web page that is of interest to the user. For example, the user can issue a save command to the browser, which causes the browser to persistently store a complete copy of the web page, including all of its HTML source, as well as associated resources of various types. As another example, the user can use a bookmarking function of the browser to save in a bookmark the URL that was used to retrieve the web page. Additionally, the user can use a clipboard provided by the operating system to select the portion of the web page of interest within the browsers; copy that portion to the clipboard; paste the portion from the clipboard into a word processing document; and save the word processing document.

BRIEF DESCRIPTION OF THE DRAWINGS

FIG. 12 is a data structure diagram showing sample contents of a portion table maintained by the facility in some embodiments.

DETAILED DESCRIPTION

Figure 1:
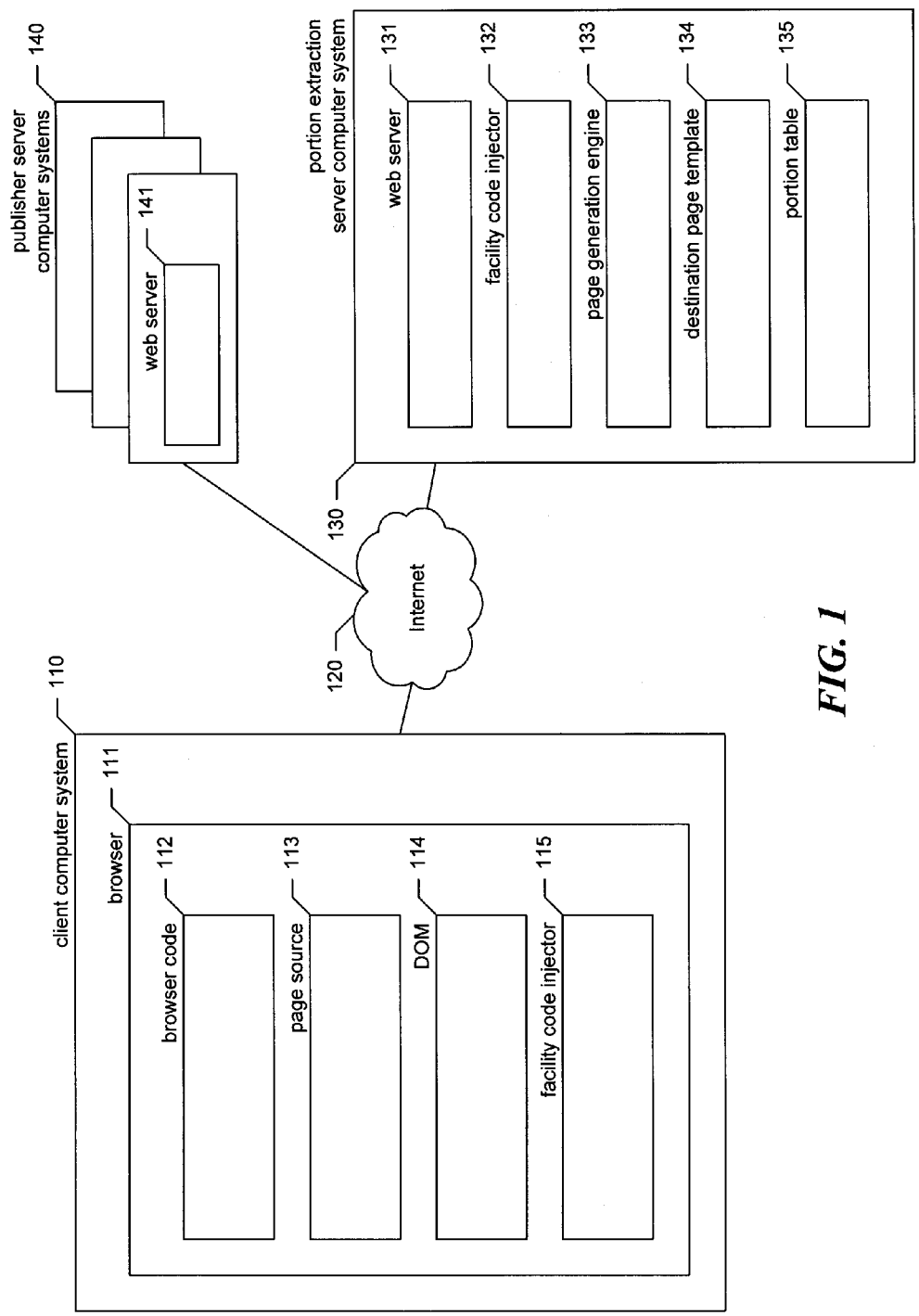
FIG. 1 is a block diagram showing some of the components typically incorporated in at least some of the computer systems and other devices on which an embodiment of a method, also referred to herein as a facility, operates.

The inventor has recognized significant disadvantages in conventional approaches to retaining a portion of a web page. For example, the conventional approach involving causing the browser to save the web page has the disadvantages that portions of the page not of interest to the user are retained along with the portion of interest; the files produced by the browser save operation can be large and unwieldy; and the retained portion cannot be easily associated with retained portions of other pages. The conventional approach involving creating a bookmark containing the page's URL fails to identify the portion of the page that was of interest to the user; and is vulnerable to the removal of the page, a change in the URL with which it can be retrieved, or its alteration to remove, relocate, or alter the portion of interest. The conventional approach involving using the clipboard to copy the portion of interest to a word processing document has the disadvantages that the portion may not look or behave in the same ways that it does in the web page.

In order to overcome these disadvantages of conventional approaches, the inventor has invented a software and/or hardware facility for extracting a portion of a document, such as a web page represented in HTML or another tag language. The document from which the facility extracts a portion is referred to herein as "the page," irrespective of this document's type.

In some embodiments, the facility makes use of executable code within the page, such as javascript code. In some embodiments, this code is included as a native part of the page; in some embodiments, the code is injected into the page, such as after retrieval by a bookmarklet or a toolbar.

In some embodiments, the facility adds to the page a user interface that enables the user to select a portion of the page, such as by selecting within a hierarchical representation of the page such as a Document Object Model ("DOM") structure one or more nodes of the hierarchy each defining a subtree of the nodes of the hierarchy. In some embodiments, as part of the selection of the portion of the page, the user interface displays a visual indication of the portion, such as a rectangle surrounding the portion.

In some embodiments, when the portion has been selected, the facility constructs a copy of the portion that is local to the page. In particular, the facility at least partially copies each of the selected nodes of the page and its descendants to descend from a "reset" node added to the page by the facility. In general, a node of the page can have particular values for style attributes either by virtue of these attributes being explicitly specified for the node in the source for the page ("inline attributes"), and/or by inheriting these attributes from ancestor nodes in the page hierarchy ("inherited attributes"), and/or by being specified via a CSS selector, which is effectively a pattern that can match on an element's type, id, class, or context. When there are multiple style rules that could be applied to an element that are in conflict, the general approach to resolving the conflict is to apply the most specific specification. Thus, CSS selectors trump inherited attributes, more specific CSS selectors (like an id) trump generic selector (like a class name or type name), and inline CSS trumps everything. The reset node specifies a stylesheet, such as a CSS stylesheet that (1) cuts off inheritance of style attribute values from ancestors of the resent node to descendants of the reset node, and (2) establishes, for inheritance by descendents of the reset node, a standard set of style attribute values. When the facility copies the selected nodes and the nodes that descend from them into the local copy, the facility initially copies only a limited subset of the inline attributes along with the copied node, in some cases none. As part of or after performing this copy operation, the facility performs a parallel root-to-leaves traversal of each selected subtree and the corresponding subtree in the local copy. For each pair of nodes visited in these traversals (one in the selected subtree and one in the local copy), the facility queries the browser for the computed attribute values of the node. The computed attribute values of a node are those used by the browser in rendering that node within the rendered version of the page, determined by first determining the set of attribute values the node inherits from its ancestors, then overriding these in any ways specified by the node's inline attributes. For each computed attribute value of the node of the pair in the selected subtree that differs from the computed value of the same attribute of the node of the pair in the local copy, the facility establishes an inline attribute for the node of the pair in the local copy that specifies the computed attribute value of the node of the pair in the selected subtree. Accordingly, the local copy ends up with all of the nodes of the selected subtree(s), with the same computed attribute values in each node of the copy, and with an inline attribute in a node of the copy only where the computed value of the corresponding node of the selected subtree differs from the value of the same attribute inherited by the node of the copy form the reset node and the node's ancestors in the copied subtree.

After the local copy is generated, the facility exports the local copy to a location outside the page. For example, in various embodiments, the facility appends tag language source representing the local copy to a destination page of page portions extracted by the same user, or adds tag language source representing the local copy to a table of page portions all extracted by the same user that may be used to dynamically generate a destination page of page portions extracted by the same user. In some embodiments, as part of exporting the copy, the facility applies one or more compression techniques, in some embodiments including a compression technique specifically adapted to the tag language.

When the facility includes an exported portion copy in the destination page, it both (1) reverses any applied compression techniques to recover the uncompressed tag language representation of the portion copy, and (2) establishes the portion copy as the child(ren) of a reset node in the destination page. In the rendered destination page, the portion copy typically appears in a manner that is largely or completely visually identical to the portion as selected in its original page, including parts of the portion corresponding to each native and external resources. Controls in the portion copy typically operate in the same way they do in the portion as selected in its original page.

In some embodiments, the destination page generated by the facility includes controls for sorting and/or subsetting the page portions extracted by the same user, such as based on date, category, tags, domain, etc.

By operating in some or all of the ways described above, the facility extracts a high-fidelity, similarly-behaving copy of a page portion having relatively modest storage requirements for future enjoyment of a user.

FIG. 1 is a high-level data flow diagram showing data flow within a typical arrangement of components used to provide the facility. A web client computer system 110 that is under user control generates and sends a request for a facility code injector to a portion extraction server computer system via a network such as the Internet 120, such as with a browser program 111 having browser 112. A web server program 131 on the portion extraction server computer system receives the request and replies with the facility code injector 132, which is in some embodiments a bookmarklet for injecting client code for the facility into web pages to enable portion extraction from them. The received facility code injector is installed (115) in connection with the browser 111 on the client computer system. The client computer system then generates and sends a content request to a content server 140, such as a browser page request. The content server typically replies to each request with served content, such as with a web server program 141.

When the client computer system receives the response to its content request containing the HTML source for a web page, it is stored (113) by the browser, which parses the page source in order to construct the document object model data structure ("DOM") 114 that the browser uses to display this web page. While the web page is displayed in the browser, the user can activate the facility code injector to inject into the page facility code for selecting and extracting a portion of the page. The user can then use the facility to select and extract a portion of the page. The extracted version of this portion is stored in a portion table 135 in the portion extraction server computer system. The user can subsequently request a destination page from the portion extraction server computer system. When this happens, a page generation engine 133 on the portion extraction server computer system uses a destination page template to retrieve web page portions extracted by the user from the portion table and incorporate them in a destination page generated by the portion extraction server computer system and return to the client computer system in response to the request, where the generated destination page containing the web page portions extracted by the user can be displayed and interacted with in the browser.

While various embodiments are described in terms of the environment described above, those skilled in the art will appreciate that the facility may be implemented in a variety of other environments including a single, monolithic computer system, as well as various other combinations of computer systems or similar devices connected in various ways.

Figure 2:
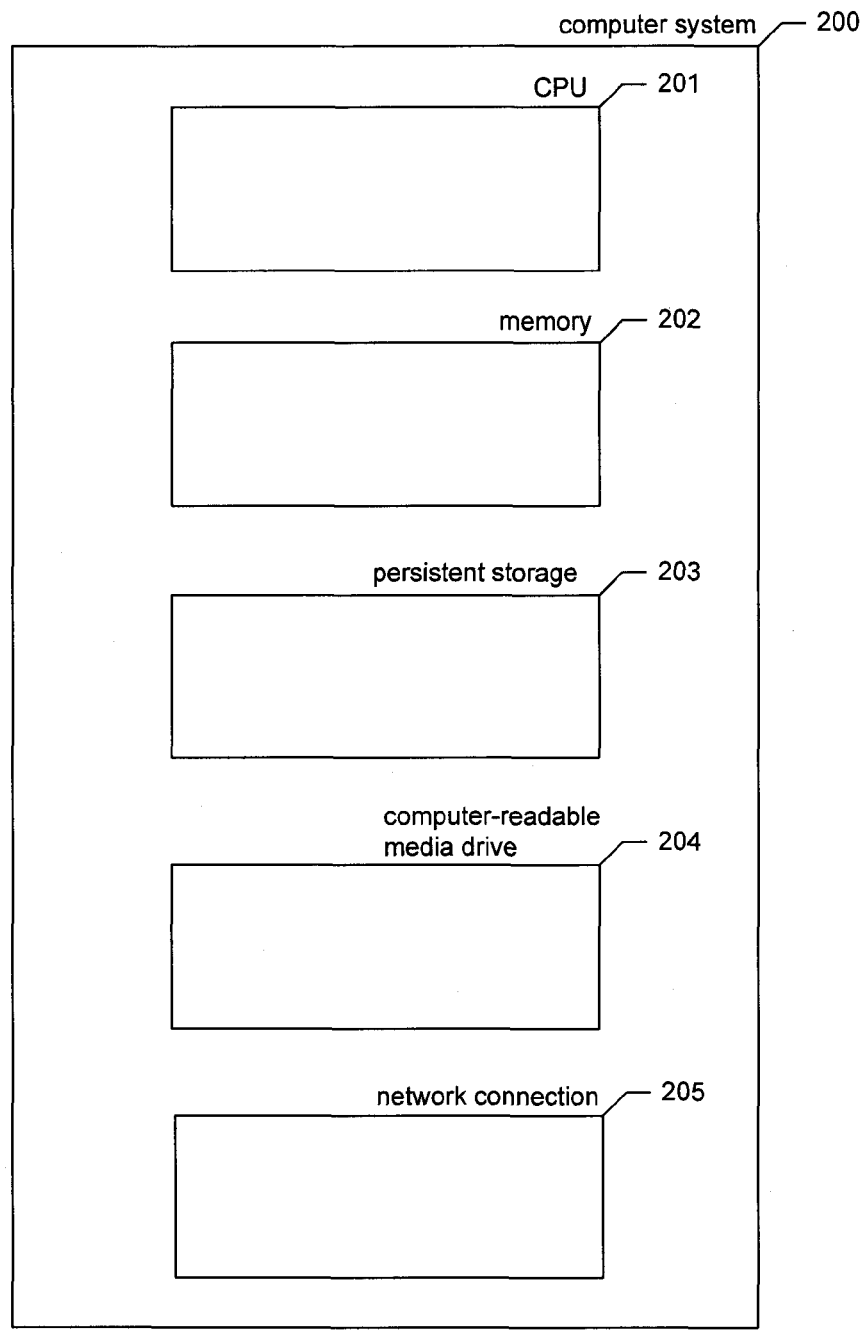
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes. In various embodiments, these computer systems and other devices 200 can include server computer systems, desktop computer systems, laptop computer systems, tablets, netbooks, mobile phones, personal digital assistants, televisions, digital video recorders, set top boxes, cameras, automobile computers, electronic media players, etc. In various embodiments, these computer systems and devices 200 may include one or more central processing units ("CPUs") 201 for executing computer programs; a computer memory 202 for storing programs and data while they are being used, including the facility and associated data; a persistent storage device 203, such as a hard drive for persistently storing programs and data; a computer-readable media drive 204, such as a floppy, CD-ROM, or DVD drive, for reading programs and data stored on a computer-readable medium; and a network connection 205 for connecting the computer system to other computer systems, such as via the Internet or another data transmission network and its networking hardware, such as switches, routers, repeaters, electrical cables and optical fibers, light emitters and receivers, radio transmitters and receivers, and the like, so that data signals such as data signals conveying data structures, programs, and unstructured data may be sent between such computer systems. While computer systems configured as described above are typically used to support the operation of the facility, those skilled in the art will appreciate that the facility may be implemented using devices of various types and configurations, and having various components.

Figure 3:
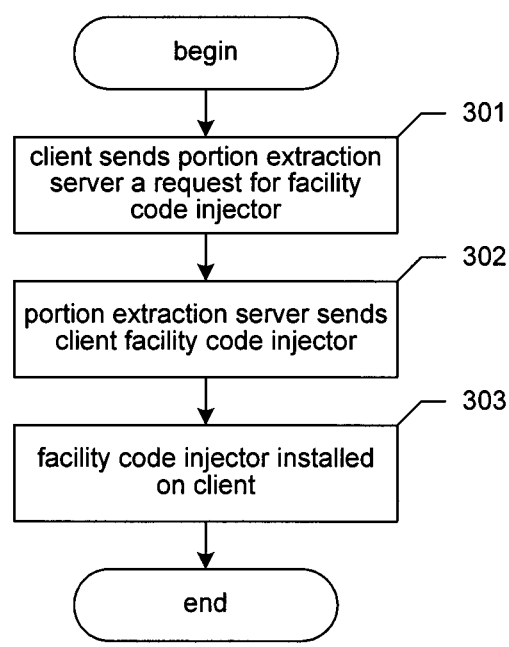
FIG. 3 is a flow diagram showing steps performed by the facility to install itself on a client computer system in some embodiments.

FIG. 3 is a flow diagram showing steps performed by the facility to install itself on a client computer system in some embodiments. In step 301, the client computer system sends to the portion extraction server a request for the facility's code injector. In step 302, the portion extraction server sends this code injector to the client. When the facility code injector is received by the client, the client installs the facility code injector, such as by installing a bookmarklet in one or more browsers installed on the client. After step 303, these steps conclude.

Those skilled in the art will appreciate that the steps shown in FIG. 3 and in each of the other flow diagrams discussed herein may be altered in a variety of ways. For example, the order of the steps may be rearranged; some steps may be performed in parallel; shown steps may be omitted, or other steps may be included; a shown step may be divided into substeps, or multiple shown steps may be combined into a single step, etc.

An example in which a user retrieves a web page and uses the facility to extract a portion from it follows. In the example, the user retrieves the web page by typing its URL, "http://example.com/", into the URL field of the browser. In response, the facility retrieves the HTML source for the sample web page shown below in Table A from a publisher server computer system.

TABLE A

```
1   <!doctype html>
2   <html>
3     <head>
4       <title>Clipping Example</title>
5       <style>
6         body {
7           margin: 20px 100px;
8           font-family: arial;
9         }
10        .framed {
11          border: 1px solid red;
12          padding: 10px;
13        }
14        .framed span {
15          font-style:italic;
16        }
17      </style>
18    </head>
19    <body>
20
21      <p>very first paragraph.</p>
22
23      <p class="framed">
24        This is a paragraph of text that has the "framed" class set to
25        it. <span style="font-weight:normal;">This is a span that is
26        styled through a CSS selector rule. It has
27        a <a href="link">link</a> inside of it.</span> This is the last
28        sentence, which has a standard <b>bold</b> in it word.
29      </p>
```

TABLE A-continued

```
30
31      <p>very last paragraph.</p>
32    </body>
33  </html>
```

Figure 4:
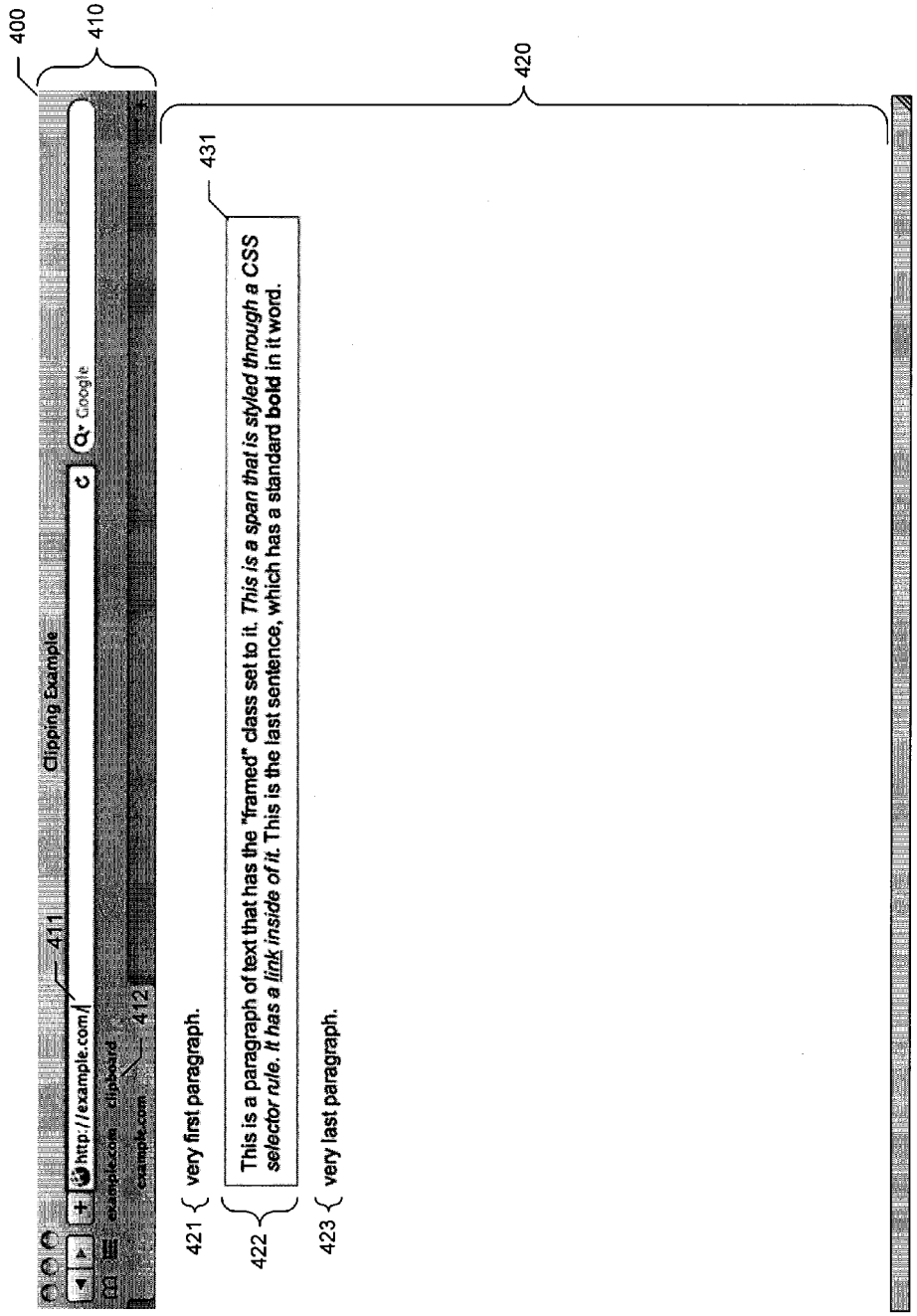
FIG. 4 is a display diagram showing the browser's display of the sample web page.

FIG. 4 is a display diagram showing the browser's display of the sample web page. The display includes a browser window 400 made up of a browser control area 410 containing browser controls and a browser client area 420 containing a rendered version of the sample web page. It can be seen that the browser control area includes a URL field 411 containing the URL of the sample web page and a button 412 for enabling the facility with respect to the page, such as by launching a bookmarklet associated with the facility to inject code for the facility into the page. It can also be seen that the rendered sample web page shown in the client area 420 contains three paragraphs, 421, 422, and 423, and that the second paragraph 422 is surrounded by a border 431. By comparing the rendered web page to the HTML source for the web page in Table A, it can be seen that paragraph 421 corresponds to the <p> node in line 21; paragraph 422 corresponds to the <p> node in lines 23-29; and paragraph 423 corresponds to the <p> node in line 31.

Figure 5:
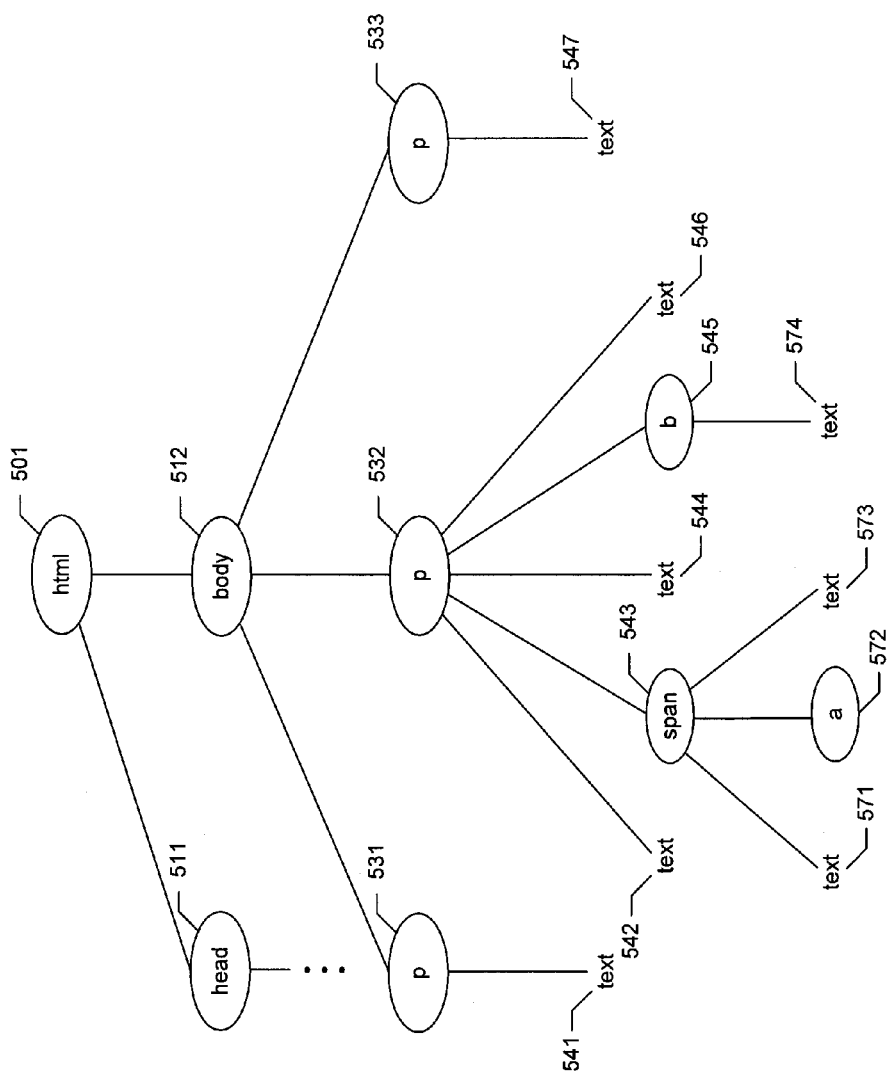
FIG. 5 is a data structure diagram showing a Document Object Model ("DOM") constructed by the browser for the sample page.

FIG. 5 is a data structure diagram showing the DOM constructed by the browser for the sample page. The root of the DOM is an HTML node 501 corresponding to the <html> tag in lines 2-33 of the source. The head node 511 is a child of the HTML node 501, and corresponds to the <head> tag in lines 3-18, which contains the title of the page in a <title> tag on line 4, and styles used in the page in a <style> tag on lines 5-17. The descendents of head node 511 are not shown in FIG. 5. The HTML node 501 has a second child node, body node 512, corresponding to the <body> tag in lines 19-32. The body node 512 has three child nodes, piece base nodes 531, 532 and 533, corresponding to the <p> tags on line 21, lines 23-29, and line 31, respectively. P node 532 has the following children: a text node 542 corresponding to the text on lines 24-25; a span node 543 corresponding to the <span> tag on lines 25-27; a text node 544 corresponding to the text on lines 25-27; a b node 545 corresponding to the <b> tag on line 28; and a text node 546 corresponding to the text on line 28 after the <b> tag. The span node 543 has the following children: a text node 571 corresponding to the text on line 24 and line 25 before the <span> tag; an a node 572 corresponding to the <a> tag on line 27; and a text node 573 corresponding to the text on line 27 after the <span> tag in line 28 before the <b> tag. Node 545 has a single child, text node 574 corresponding to the text inside the <b> tag on line 28.

Returning to FIG. 4, with the sample page displayed, the user selects button 412 to enable the facility with respect to the page, such as by injecting code for the facility into the page.

Figure 6:
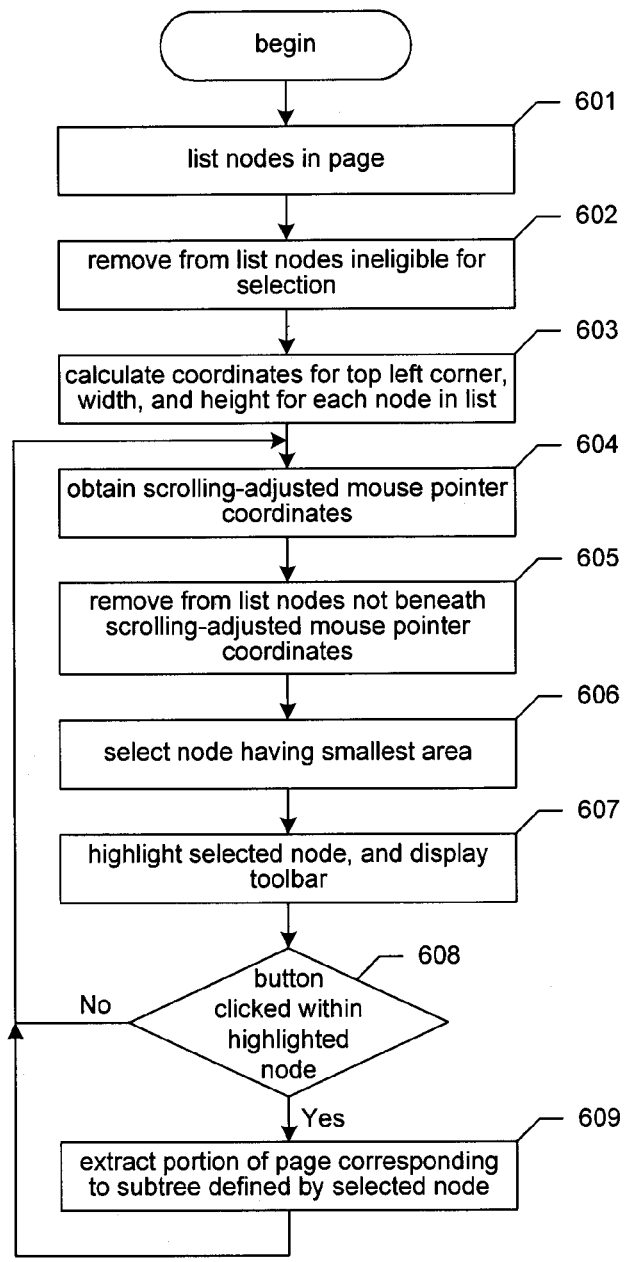
FIG. 6 is a flow diagram that shows steps performed by the facility when it is enabled for a page in some embodiments.

FIG. 6 is a flow diagram that shows steps performed by the facility when it is enabled for a page in some embodiments. In step 601, the facility generates a list of nodes in the page, such as by traversing the DOM generated for the page by the browser, or performing queries against the DOM. In some embodiments, the facility uses a jQuery javascript library available from jquery.com to query, traverse, augment, and manipulate the DOM. In step 602, the facility removes from the list of nodes generated in step 601 any node that is ineligible to be selected for extraction. In various embodiments, the facility uses various tests in order to identify nodes ineligible for selection, including one or more of the following: its value for the visibility attribute is hidden; it has no text of its own, and is not the ancestor of a text or image node; it has a display area that is larger than the viewport of the page or smaller than a minimum area, such as 10,000 pixels; or it has no sibling nodes, i.e., it is the only child of its parent. In step 603, for each node in the list, the facility calculates the coordinates at which its top left corner is displayed, and its width and height. In step 604, the facility obtains the current, scrolling-adjusted coordinates of the mouse pointer. In step 605, the facility removes from the list any nodes that are not beneath the scrolling-adjusted mouse pointer coordinates obtained in step 604. In step 606, the facility selects the node on the list having the smallest area. In step 607, the facility highlights the selected node and displays a floating toolbar for the facility.

Figure 7:
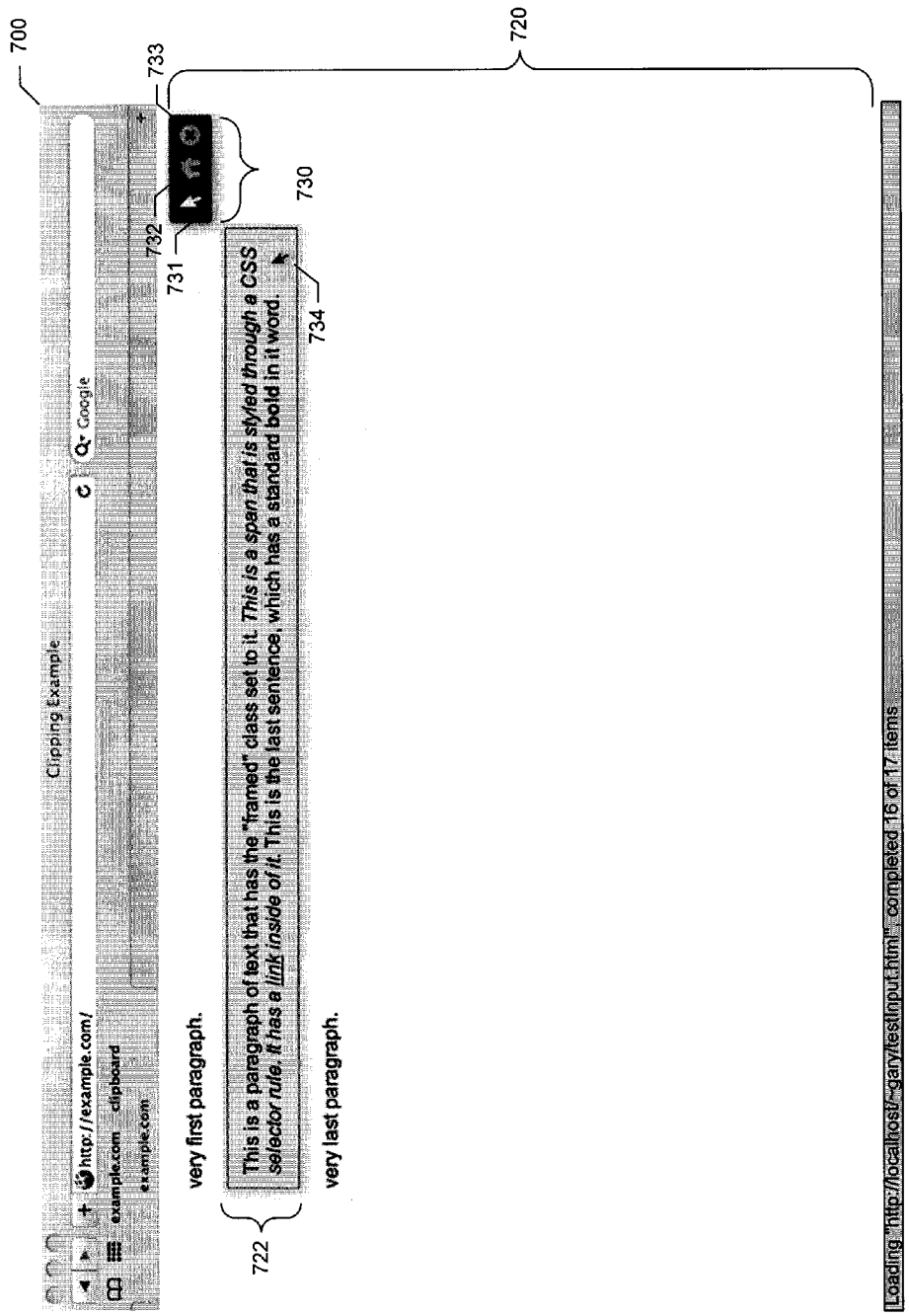
FIG. 7 is a display diagram showing a display presented by the facility in which a selected node is highlighted.

FIG. 7 is a display diagram showing a display presented by the facility in some embodiments in which a selected node is highlighted. It can be seen that, in the client area 720 in which the rendered version of the page is displayed, the user has positioned the mouse pointer 734 inside the paragraph node 722. In response, the facility has selected paragraph node 722 in step 609, and highlighted it in step 610. The facility has further displayed a facility toolbar 730 that includes controls that the user can use to interact with the facility. These include an extraction mode button 731 that the user can click in order to toggle the extraction mode such that the selection and highlighting of nodes in response to mouse movements within the page is enabled or disabled; a home button 732 for traversing to the destination page displaying portions extracted by the user; and a close button 733 for closing the facility toolbar.

Returning to FIG. 6, in step 608, if the user has clicked the mouse button within the node highlighted in step 607, then the facility continues in step 609, else the facility continues in step 604 to obtain new mouse pointer coordinates and potentially deselect the currently-selected node, and potentially select a new node. In step 609, the facility extracts the portion of the page corresponding to the subtree of the DOM defined by the selected node, that is, the subtree of the DOM that has the selected node as its root. Step 609 is discussed in greater detail below in connection with FIG. 8. After step 609, the facility continues in step 604.

In some embodiments, as part of the steps performed by the facility when it is enabled for a page (not shown), it monitors for the user clicking on the extraction mode button 731, and, in response, toggles the extraction mode on or off, such that the process of selecting and highlighting a node for extraction is disabled or enabled.

In some embodiments, rather than selecting in step 606 the node under the mouse pointer having the smallest area, the facility uses the following logic to select a node based upon the location of the mouse pointer: The facility initializes a score for each node on the list to be initially set equal to 1. If the mouse pointer coordinates indicate that the mouse pointer is within a node on the list, then the facility reduces the score for the node containing the mouse pointer to the value 0.1. For each node on the list, the facility multiplies the node's score by both (1) the square of the distance from the mouse pointer to the upper-left corner of the node and (2) the square root of the node's area. The facility then selects the node on the list having the lowest score.

Figure 8:
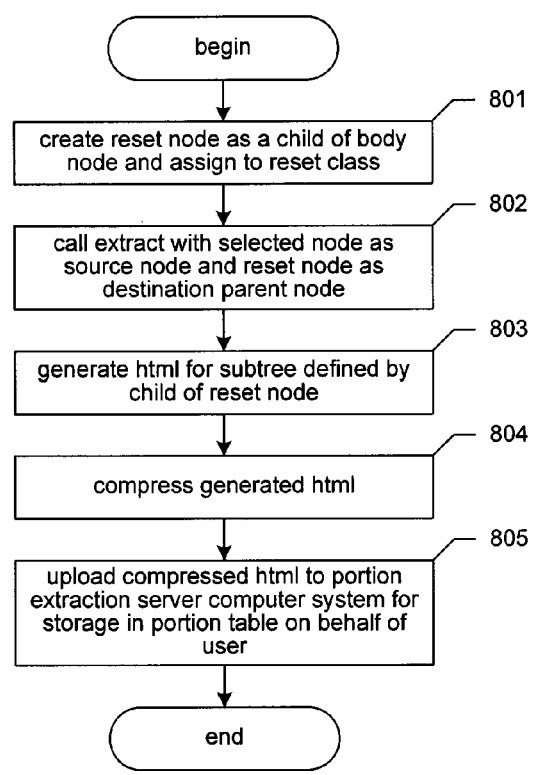
FIG. 8 is a flow diagram showing steps performed by the facility in order to extract a portion of a webpage corresponding to a subtree defined by a selected node.

FIG. 8 is a flow diagram showing steps performed by the facility in some embodiments in order to extract a portion of a webpage corresponding to a subtree defined by a selected node. In step 801, the facility creates in the DOM a reset node as a child of the body node—in the case of the example, body node 512 shown in FIG. 5. In some embodiments, the reset node created in step 801 has the node type div; visibility attribute is set to the value hidden; position attribute is set to absolute; and position and dimension attribute values are set identical to the selected node that is the root of the original portion subtree. Also in step 801, the facility assigns the reset node to a reset class. A reset class used by the facility in some embodiments is shown below in Table B.

TABLE B

```
 1  .clipping {
 2    font-family: times;
 3    font-size: 16px;
 4    font-weight: normal;
 5    font-style: normal;
 6    color: black;
 7    line-height:100%;
 8    margin:0; padding: 0;
 9  }
10  .clipping td {
11    font-size: 16px;
12  }
13  .clipping * {
14    color: black;
15    font:inherit;
16  }
17  .clipping a {
18    text-decoration:underline;
19  }
20  .clipping html, .clipping address,
21  .clipping blockquote,
22  .clipping body, .clipping dd, .clipping div,
23  .clipping d, .clipping dt, .clipping fieldset, .clipping form,
24  .clipping frame, .clipping frameset,
25  .clipping h1, .clipping h2, .clipping h3, .clipping h4,
26  .clipping h5, .clipping h6, .clipping noframes,
27  .clipping ol, .clipping p, .clipping ul, .clipping center,
28  .clipping dir, .clipping hr, .clipping menu, .clipping pre
29              { display: block; }
30  .clipping li       { display: list-item; list-style-type:none; }
31  .clipping head     { display: none }
32  .clipping table    { display: table }
33  .clipping tr       { display: table-row }
34  .clipping thead    { display: table-header-group }
35  .clipping tbody    { display: table-row-group }
36  .clipping tfoot    { display: table-footer-group }
37  .clipping col      { display: table-column }
38  .clipping colgroup { display: table-column-group }
39  .clipping td, th   { display: table-cell }
40  .clipping caption  { display: table-caption }
41  .clipping th       { font-weight: bolder; text-align: center }
42  .clipping caption  { text-align: center }
43  .clipping h1       { font-size: 2em; margin: .67em 0 }
44  .clipping h2       { font-size: 1.5em; margin: .75em 0 }
45  .clipping h3       { font-size: 1.17em; margin: .83em 0 }
46  .clipping h4, .clipping p,
47  .clipping blockquote, .clipping ul,
48  .clipping fieldset, .clipping form,
49  .clipping ol, .clipping dl, .clipping dir,
50  .clipping menu     { margin: 1.12em 0 }
51  .clipping h5       { font-size: .83em; margin: 1.5em 0 }
52  .clipping h6       { font-size: .75em; margin: 1.67em 0 }
53  .clipping h1, .clipping h2, .clipping h3, .clipping h4,
54  .clipping h5, .clipping h6, .clipping b,
55  .clipping strong   { font-weight: bolder }
56  .clipping blockquote { margin-left: 40px; margin-right: 40px }
57  .clipping i, .clipping cite, .clipping em,
58  .clipping var, .clipping address
59              { font-style: italic; font-weight: normal }
60  .clipping pre, .clipping tt, .clipping code,
61  .clipping kbd, .clipping samp       { font-family: monospace }
62  .clipping pre                       { white-space: pre; background-
       color: transparent;
63              margin: 0; padding: 0 }
64  .clipping button, .clipping textarea,
65  .clipping input, .clipping select   { display: inline-block }
66  .clipping big      { font-size: 1.17em }
67  .clipping small, .clipping sub, .clipping sup { font-size: .83em }
68  .clipping sub      { vertical-align: sub }
```

TABLE B-continued

| | | |
|---|---|---|
| 69 | .clipping sup | { vertical-align: super } |
| 70 | .clipping table | { border-spacing: 2px; } |
| 71 | .clipping thead, .clipping tbody, | |
| 72 | .clipping tfoot | { vertical-align: middle } |
| 73 | .clipping td, .clipping th, .clipping tr | { vertical-align: inherit } |
| 74 | .clipping s, .clipping strike, .clipping del | { text-decoration: line-through } |
| 75 | .clipping hr | { border: 1px inset } |
| 76 | .clipping ol, .clipping ul, .clipping dir, | |
| 77 | .clipping menu, .clipping dd | { margin-left: 40px } |
| 78 | .clipping ol | { list-style-type: decimal } |
| 79 | .clipping ul, .clipping ol | { margin: 0; padding: 0 } |
| 80 | .clipping u, .clipping ins | { text-decoration: underline } |
| 81 | .clipping br:before | { content: "\A"; white-space: pre-line } |
| 82 | .clipping center | { text-align: center } |
| 83 | .clipping :link, .clipping :visited | { text-decoration: underline } |
| 84 | .clipping :focus | { outline: thin dotted invert } |

Again, the reset class is intended to establish a common set of default CSS style attribute values that correspond to typical browser default values for both the portion copy subtree constructed in the DOM of the page from which the portion is extracted, and the portion copy subtree that is "reconstituted" in the portion destination page. In particular, the attribute values of the reset class are chosen to match, as closely as possible, the attributes with which web pages are most commonly rendered, to minimize the number of inline attributes established in the portion copy subtree by the facility. The sample reset class shown in Table B has the name "clipping". In some embodiments (not shown), the facility uses a more obscure name, or randomly generates a name, in order to decrease the likelihood that the reset class's name will collide with a class that is native to the page.

Figure 10:
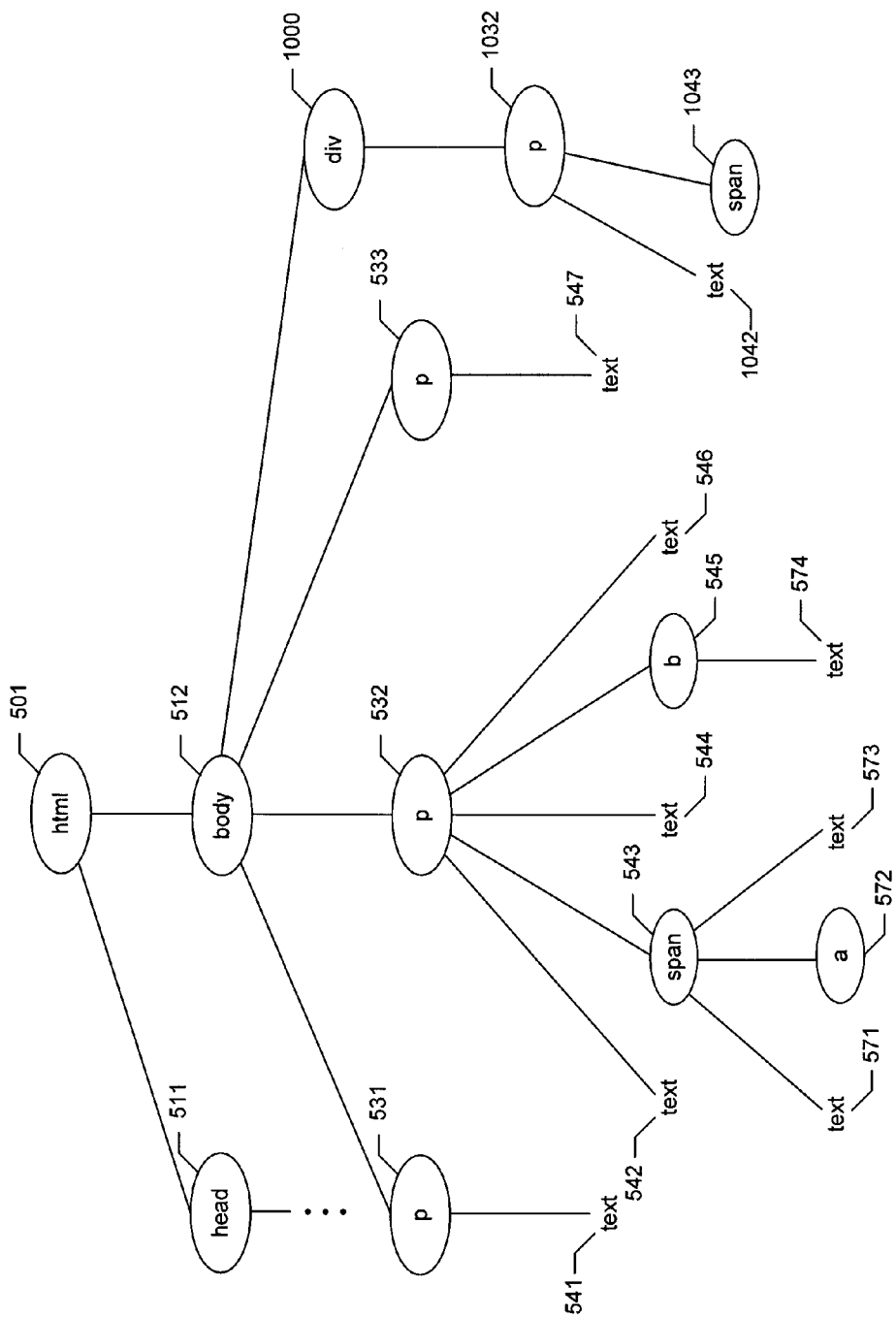
FIG. 10 is a data structure diagram shelling a partially-constructed version of a portion copy subtree generated by the facility.

FIG. 10 is a data structure diagram showing a partially-constructed version of the portion copy subtree generated by the facility in some embodiments. It can be seen that, in step 901, the facility established div node 1000 as the reset node, which is a child of body node 512. FIG. 10 is discussed in greater detail below.

In step 802, the facility calls an extract node function for extracting a single node of a webpage portion being extracted. The extract node function has two parameters: source node, i.e., the node of the original portion in the page to copy, and destination parent node, i.e., the node of the portion copy being generated in the DOM that is to be the parent of the copy made of the source node. Details of the extract node function are discussed below in connection with FIG. 9.

Figure 9:
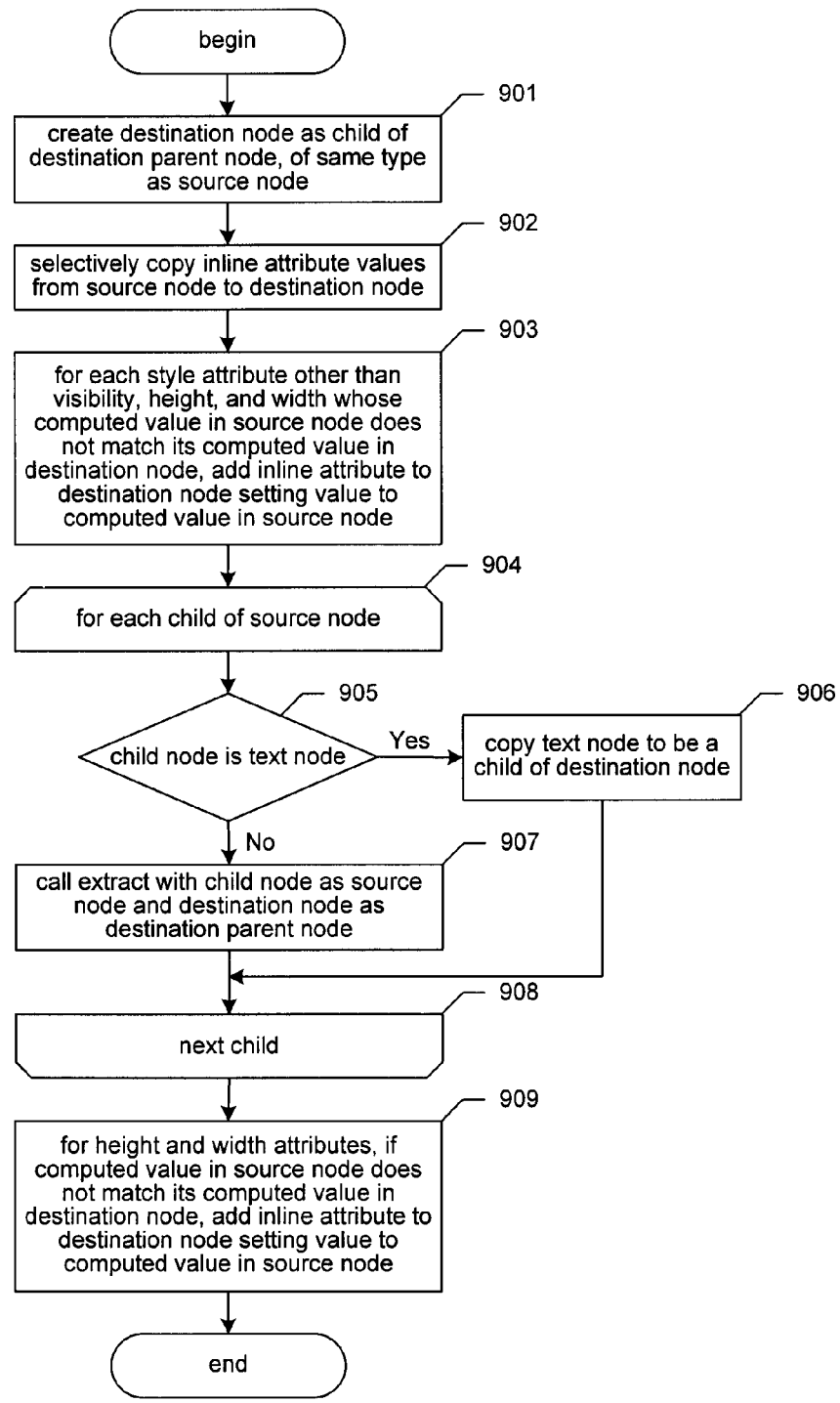
FIG. 9 is a flow diagram showing steps performed by the facility as part of the extract function for extracting a simple node of a webpage portion being extracted.

FIG. 9 is a flow diagram showing steps performed by the facility in some embodiments as part of the extract node function for extracting a single node of a webpage portion being extracted. As described above, it has two parameters: source node and destination parent node. In step 901, the facility creates a destination node as a child of the destination parent node. The destination node created in step 901 has the same type as the source node. In reviewing FIG. 10, it can be seen that the P node 1032 that is created in the copy subtree in step 901 when the extract node function is called with P node 532 of the original portion as the source node has the same type as node 532, and has child text node 1042 corresponding to text node 542. When the extract node function is called with span node 543 of the original portion as the source node, the facility creates span node 1043 in the copy subtree in step 901.

In step 902, the facility selectively copies inline attribute values from the source node to the destination node. In various embodiments, the selective copying of inline attribute values uses one or more of the rules shown below in Table C.

TABLE C

| | |
|---|---|
| 1 | If source node has tag "input", then copy source node's "type" attribute to destination node. If source node "type" is not "hidden", then also copy node's "value" attribute to destination node. |
| 2 | If source node has tag "embed", "object", or "param", then copy all of source node's attributes to destination node. |
| 3 | If source node has tag "button", then copy the outer width and outer height attributes of source node to destination node. |
| 4 | If source node has tag "img", then copy the "src" attribute from source node to destination node, transforming the value of the "src" attribute from a relative URL to an absolute URL if relative. |
| 5 | If source node has tag "a", then copy the "href" attribute from source node to destination node, transforming the value of href from a relative URL to an absolute URL if relative. |
| 6 | All other attributes of source node are ignored and not copied. |

In step 903, for each style attribute other than the visibility, height, and width style attributes, the facility determines a computed value fir that attribute in both the source node and the destination node, and compares these two computed values for the attribute. If the compared values do not match, the facility adds an inline attribute to the destination node setting the value of the attribute to the value computed for the attribute in the source node. Table D below shows the results of this comparison between destination span node 1043 shown in FIG. 10 and corresponding source span node 543.

TABLE D

| | Attribute | Value in Source | Value in Copy | Match |
|---|---|---|---|---|
| 01 | -webkit-border-bottom-left-radius | 0px" | "0px" | TRUE |
| 02 | -webkit-border-bottom-right-radius | 0px" | "0px" | TRUE |
| 03 | -webkit-border-top-left-radius | "0px" | "0px" | TRUE |
| 04 | -webkit-border-top-right-radius | "0px" | "0px" | TRUE |
| 05 | -webkit-box-shadow | "none" | "none" | TRUE |
| 06 | background-attachment | "scroll" | "scroll" | TRUE |
| 07 | background-clip | "border-box" | "border-box" | TRUE |
| 08 | background-color | "rgba (0, 0, 0, 0)" | "rgba (0, 0, 0, 0)" | TRUE |
| 09 | background-image | "none" | "none" | TRUE |
| 10 | background-origin | "padding-box" | "padding-box" | TRUE |
| 11 | background-position | "0% 0%" | "0% 0%" | TRUE |
| 12 | background-position-x | "0%" | "0%" | TRUE |
| 13 | background-position-y | "0%" | "0%" | TRUE |

TABLE D-continued

| | Attribute | Value in Source | Value in Copy | Match |
|---|---|---|---|---|
| 14 | background-repeat | "repeat" | "repeat" | TRUE |
| 15 | border-bottom-color | "rgb (0, 0, 0)" | "rgb (0, 0, 0)" | TRUE |
| 16 | border-bottom-left-radius | "0px" | "0px" | TRUE |
| 17 | border-bottom-right-radius | "0px" | "0px" | TRUE |
| 18 | border-bottom-style | "none" | "none" | TRUE |
| 19 | border-bottom-width | "0px" | "0px" | TRUE |
| 20 | border-collapse | "separate" | "separate" | TRUE |
| 21 | border-left-color | "rgb (0, 0, 0)" | "rgb (0, 0, 0)" | TRUE |
| 22 | border-left-style | "none" | "none" | TRUE |
| 23 | border-left-width | "0px" | "0px" | TRUE |
| 24 | border-right-color | "rgb (0, 0, 0)" | "rgb (0, 0, 0)" | TRUE |
| 25 | border-right-style | "none" | "none" | TRUE |
| 26 | border-right-width | "0px" | "0px" | TRUE |
| 27 | border-spacing | "0px 0px" | "0px 0px" | TRUE |
| 28 | border-top-color | "rgb (0, 0, 0)" | "rgb (0, 0, 0)" | TRUE |
| 29 | border-top-left-radius | "0px" | "0px" | TRUE |
| 30 | border-top-right-radius | "0px" | "0px" | TRUE |
| 31 | border-top-style | "none" | "none" | TRUE |
| 32 | border-top-width | "0px" | "0px" | TRUE |
| 33 | bottom | "auto" | "auto" | TRUE |
| 34 | caption-side | "top" | "top" | TRUE |
| 35 | clear | "none" | "none" | TRUE |
| 36 | clip | "auto" | "auto" | TRUE |
| 37 | color | "rgb (0, 0, 0)" | "rgb (0, 0, 0)" | TRUE |
| 38 | cursor | "auto" | "auto" | TRUE |
| 39 | direction | "ltr" | "ltr" | TRUE |
| 40 | display | "inline" | "inline" | TRUE |
| 41 | empty-cells | "show" | "show" | TRUE |
| 42 | float | "none" | "none" | TRUE |
| 43 | font-family | "arial" | "arial" | TRUE |
| 44 | font-size | "16px" | "16px" | TRUE |
| 45 | font-style | "italic" | "normal" | FALSE |
| 46 | font variant | "normal" | "normal" | TRUE |
| 47 | font weight | "normal" | "normal" | TRUE |
| 48 | left | "auto" | "auto" | TRUE |
| 49 | letter-spacing | "normal" | "normal" | TRUE |
| 50 | line-height | "normal" | "normal" | TRUE |
| 51 | list-style-image | "none" | "none" | TRUE |
| 52 | list-style-position | "outside" | "outside" | TRUE |
| 53 | list-style-type | "disc" | "disc" | TRUE |
| 54 | margin-bottom | "0px" | "0px" | TRUE |
| 55 | margin-left | "0px" | "0px" | TRUE |
| 56 | margin-right | "0px" | "0px" | TRUE |
| 57 | margin-top | "0px" | "0px" | TRUE |
| 58 | max-height | "none" | "none" | TRUE |
| 59 | max-width | "none" | "none" | TRUE |
| 60 | min height | "0px" | "0px" | TRUE |
| 61 | min width | "0px" | "0px" | TRUE |
| 62 | opacity | 1 | 1 | TRUE |
| 63 | outline-color | "rgb (0, 0, 0)" | "rgb (0, 0, 0)" | TRUE |
| 64 | outline-style | "none" | "none" | TRUE |
| 65 | outline-width | "0px" | "0px" | TRUE |
| 66 | overflow-x | "visible" | "visible" | TRUE |
| 67 | overflow-y | "visible" | "visible" | TRUE |
| 68 | padding-bottom | "0px" | "0px" | TRUE |
| 69 | padding-left | "0px" | "0px" | TRUE |
| 70 | padding-right | "0px" | "0px" | TRUE |
| 71 | padding-top | "0px" | "0px" | TRUE |
| 72 | page-break-after | "auto" | "auto" | TRUE |
| 73 | page-break-before | "auto" | "auto" | TRUE |
| 74 | page-break-inside | "auto" | "auto" | TRUE |
| 75 | position | "static" | "static" | TRUE |
| 76 | right | "auto" | "auto" | TRUE |
| 77 | table-layout | "auto" | "auto" | TRUE |
| 78 | text-align | "auto" | "auto" | TRUE |
| 79 | text-decoration | "none" | "none" | TRUE |
| 80 | text-indent | "0px" | "0px" | TRUE |
| 81 | text-transform | "none" | "none" | TRUE |
| 82 | top | "auto" | "auto" | TRUE |
| 83 | vertical-align | "baseline" | "baseline" | TRUE |
| 84 | white-space | "normal" | "normal" | TRUE |
| 85 | word-spacing | "0px" | "0px" | TRUE |
| 86 | z-index | "auto" | "auto" | TRUE |

It can be seen in line 45 that the values computed for the font-style attribute in the source and destination nodes do not match. Accordingly, in step 903, the facility establishes for destination span node 1043 an inline attribute value of font-style="italic" to match the value computed for this attribute in the source node.

In steps 904-908, the facility loops through each of the children of the source node in the order in which they occur in the DOM. For example, where the extract function is called for source node 543, in steps 904-908, the facility loops through children nodes 571, 572, and 573 of source node 543 in this order. In step 905, if the child node is a text node, then the facility continues in step 906, else a facility continues in step 907. For example, child node 571 is a text node, while child node 572 is not a text node. In step 906, the facility copies the text node to be a child of the destination node. For example, where the current child node is text node 571, the facility creates a copy of text node 571 as a child of destination span node 1043, shown in FIG. 11 as node 1171. After step 906, the facility continues in step 908. In step 907, the facility recursively calls the extract node function, setting the source node parameter equal to the current child node, and setting the destination parent node parameter equal to the destination node. In step 908, if at least one additional child of the source node remains to be processed, the facility continues in step 904 to process the next child of the source node, else the facility continues in step 909. In step 909, for each of the height and width style attributes, if the computed value of the attribute in the source node does not match the attribute's computed value in the destination, the facility adds an inline attribute to the destination node setting the value of the attribute to the value computed for the attribute in the source node. When the extract node function is called with span node 543 as the source node, the computed value of the height attribute in both the source node and the target node is "35px", so the facility does not attach an inline attribute to the destination node for this attribute. However, for the width attribute, the value in the source node is computed to be "536px", while its value in the destination node is computed to be "737px". Accordingly, the facility establishes an inline attribute in the destination node setting the value of this attribute equal to the value calculated for the attribute in the source node, "536px". After step 909, these steps conclude, and the extract node function returns.

Figure 11:
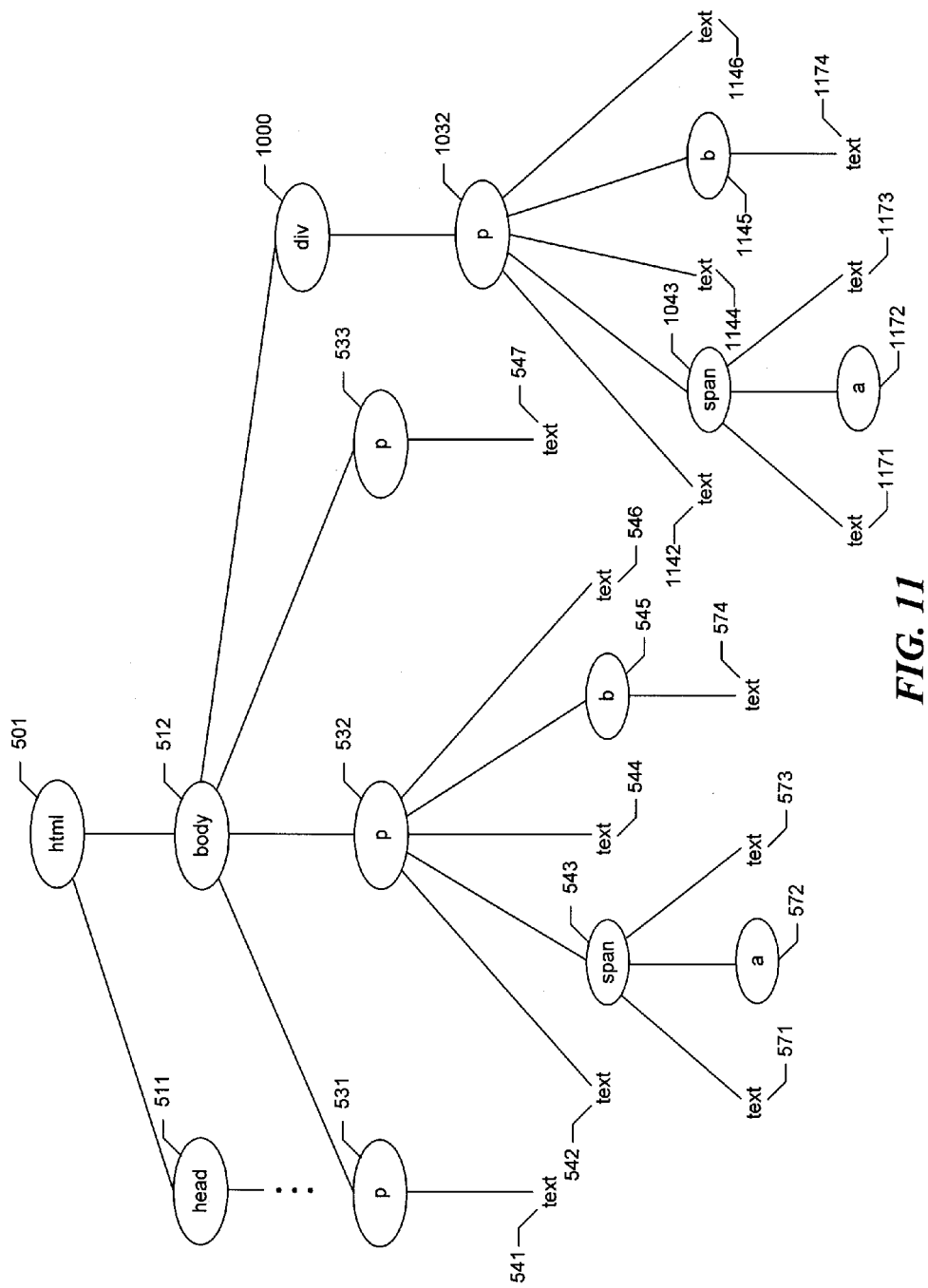
FIG. 11 is a data structure diagram showing the DOM when it contains a complete portion copy subtree.

Returning to FIG. 8, when the call made to the extract node function in step 802 returns, the facility has finished constructing the portion copy subtree in the page's DOM. FIG. 11 is a data structure diagram showing the DOM when it contains a complete portion copy subtree. It can be seen that p node 1032, which is the child of the reset node 1000, is the root of a subtree whose structure exactly matches the original portion subtree whose root is p node 532. As discussed above, the nodes of the portion copy subtree have inline attributes determined by logic of the facility in conjunction with attribute values calculated for nodes of the original portion, which are not descendents of the reset node, and the corresponding nodes of the portion copy, which are descendants of the reset node.

In step 803, the facility generates html corresponding the subtree of the DOM defined by the child of the reset node. In the case of the example, the child of the reset node that is the root of this subtree is p node 1032. Table E below shows the html generated by the facility in step 803 in the example.

TABLE E

```
1   <!doctype html>
2   <html>
3     <body>
4
5   <p style=
6   "font-family:arial;line-height:normal;margin-bottom:
7   16px;margin-top:16px;width:548px;padding:10px;border:1px solid
8   rgb(255, 0, 0);">. This is a paragraph of text that has the "framed"
9   class set to it. <span style="font-style:italic;width:536px;">This is
10  a span that is styled through a CSS selector rule. It has a <a
11  style="color:#00E;border-color:#00E;" href="http:// example.com/
12  link.html">link</a> inside of it.</span> This is the last sentence,
13  which has a standard <b style="font-weight:bold;">bold</b>
14  in it word. </p>
15    </body>
16  </html>
```

It can be seen that a <p> tag from lines 5-13 corresponds to p node 1032, the root of the copy subtree. The facility has established inline attributes for this node for several different attributes: font-family, line-height, margin-bottom, margin-top, width, padding, and border. As every other node in the copy subtree descends from p node 1032, these inline attributes are inherited by most of the other nodes in the copy subtree, and need not be repeated there. The text on lines 7-8 corresponds to text node 1142. The span tag from line 8 to line 12 corresponds to span node 1043, and has the inline attributes discussed above. The text on lines 9-10 corresponds to text node 1137. The a tag on lines 10-11 corresponds to a node 1172. The text on lines 11-12 corresponds to text node 1173. The text on line 12 corresponds to text node 1144. The b tag on lines 12-13 corresponds to b node 1145. The text inside the b node corresponds to text node 1174. The text on line 13 after the b node corresponds to text node 1146.

In step 804, the facility compresses the html generated for the portion copy in step 803. In various embodiments, the facility uses one or more of the rules shown below in Table F.

TABLE F

1. For all of the inlined style information in the generated HTML, rewrite verbose CSS declarations into shorthand form. For example, if margin-top:A, margin-right:B, margin-bottom:C, margin-left:D are all present, then this can be abbreviated as "margin: A B C D". Moreover, if A, B, C, and D are all of the same value, then this can further be abbreviated as "margin:A". Carry out these abbreviates for every know short hand form, which includes margin, padding, border, background, font, list, outline, etc. Also, convert "rgb (A, B, C)" colors into hexadecimal notation. This step is to simply reduce the size of the generated HTML without altering how it should be interpreted.
2. Compress the generated HTML with a shared dictionary. Since HTML uses a small dictionary of tag names, CSS attribute names, and common attribute values, these names and strings are frequently repeated.
Using a small dictionary allows us to refer to replace the verbose strings by an index in the dictionary, thereby reducing the total space used by the generated HTML. Since the generated HTML is transmitted over a network and stored on disk, the space savings are critical.

In step 805, the facility uploads the compressed html generated in step 804 to the portion extraction server computer system for storage in the portion table maintained on the portion extraction server computer system on behalf of the user of the client computer system. After step 805, these steps conclude.

FIG. 12 is a data structure diagram showing sample contents of a portion table maintained by the facility in some embodiments. The portion table 1200 is made up of rows, such as rows 1201-1205, each corresponding to a different portion extracted from a web page by some user. Each row is divided into the following columns: a user id column 1211 that identifies the user who extracted the portion; a date/time column 1212 that indicates the date and time at which the portion was extracted; a domain column 1213 that contains the domain of the page from the portion is extracted; a title column 1214 that contains the title of the page from which the portion is extracted; and a compressed portion html column 1215 containing the compressed html generated for the portion by the facility. For example, row 1201 corresponds to the example portion, and indicates that it was extracted by a user having user id 5553, at 10:49:13 AM PDT on Apr. 4, 2011, from the domain example.com, with the title "Clipping Example." The row contains the compressed portion html shown above in Table F in column 1215. It can be seen that rows 1202-1204 correspond to other portions extracted by the same user, while row 1205 corresponds to a portion extracted by a different user having user id 5557.

While FIG. 12 and each of the other table diagrams discussed herein show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown; etc.

Figure 13:
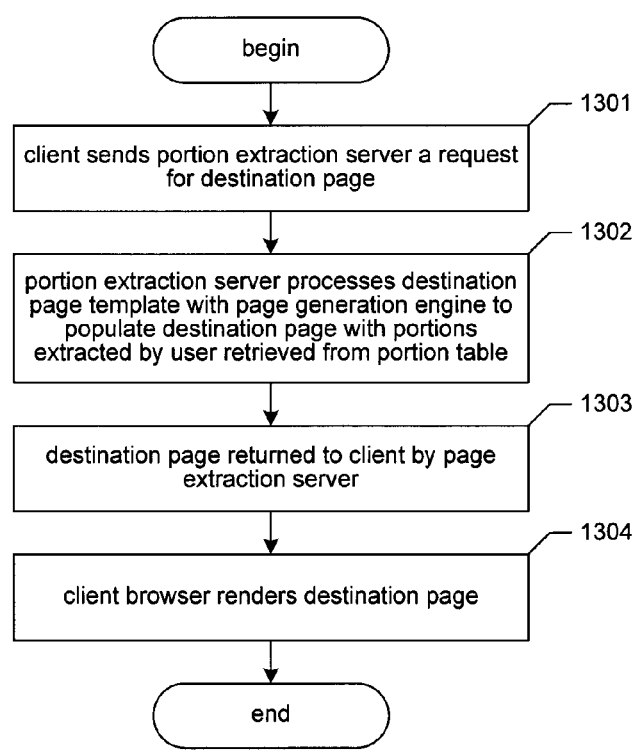
FIG. 13 is a flow diagram steps performed by the facility in order to respond to a request for a user's portion destination page showing all of the portions extracted by the user from different web pages.

FIG. 13 is a flow diagram showing steps performed by the facility in order to respond to a request for a user's portion destination page showing all of the portions extracted by the user from different web pages in some embodiments. In step 1301, the client sends a request for the destination page to the portion extraction server, such as in response to the user's activation of home button 732 in the facility toolbar shown in FIG. 7, typing the destination page's URL into the URL field of the browser, dereferencing a browser bookmark, etc. In step 1302, the portion extraction server processes a destination page template using a page generation engine to populate a destination page with portions extracted by the requesting user that are retrieved by the facility from the portion table. For example, for user having user id 5553, the facility constructs the destination page using rows 1201-1204 of the portion table. In step 1303, the facility returns the destination page to the client. In step 1304, the client browser renders the destination page, and permits the user to interact with it to both view and act on extracted portion. After step 1304, these steps conclude.

Figure 14:
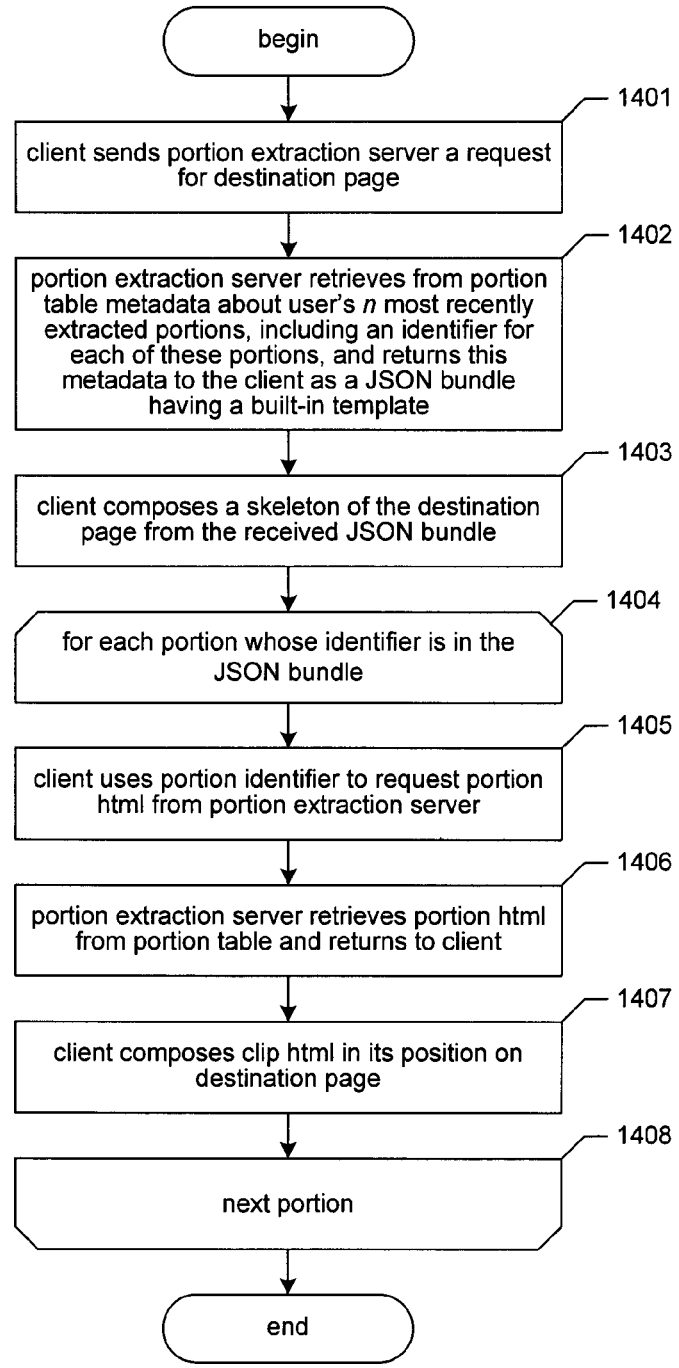
FIG. 14 is a flow diagram showing alternate steps performed by the facility in order to respond to a request for a user's portion destination page.

FIG. 14 is a flow diagram showing alternate steps performed by the facility in order to respond to a request for a user's portion destination page. In step 1401, the client sends to the portion extraction server a request for the user's destination page. In step 1402, the portion extraction server retrieves from the portion table metadata about the user's n most recently extracted portions, such as 20 portions most recently extracted by the user. A facility includes metadata about each of these end portions, along with an identifier for each, in a JSON bundle having a built-in template for the destination page. The portion extraction server returns this JSON bundle to the client. In step 1403, the client uses the template in the received JSON bundle to compose a skeleton of the destination page having an empty space in the position in which each portion will be composed. In steps 1404-1408, the facility loops through each portion whose identifier is included in the JSON bundle. In step 1405, the client uses the portion identifier to request the portion html for this portion from the portion extraction server. In step 1406, the portion extraction server retrieves the portion html for this portion from the portion table and returns it to the client. In step 1407, the client composes the received clip html in the corresponding position in the destination page skeleton. In step 1408, if additional portions remain to be processed, the facility continues in step 1404 to process the next portion. After step 1408, the steps conclude.

Figure 15:
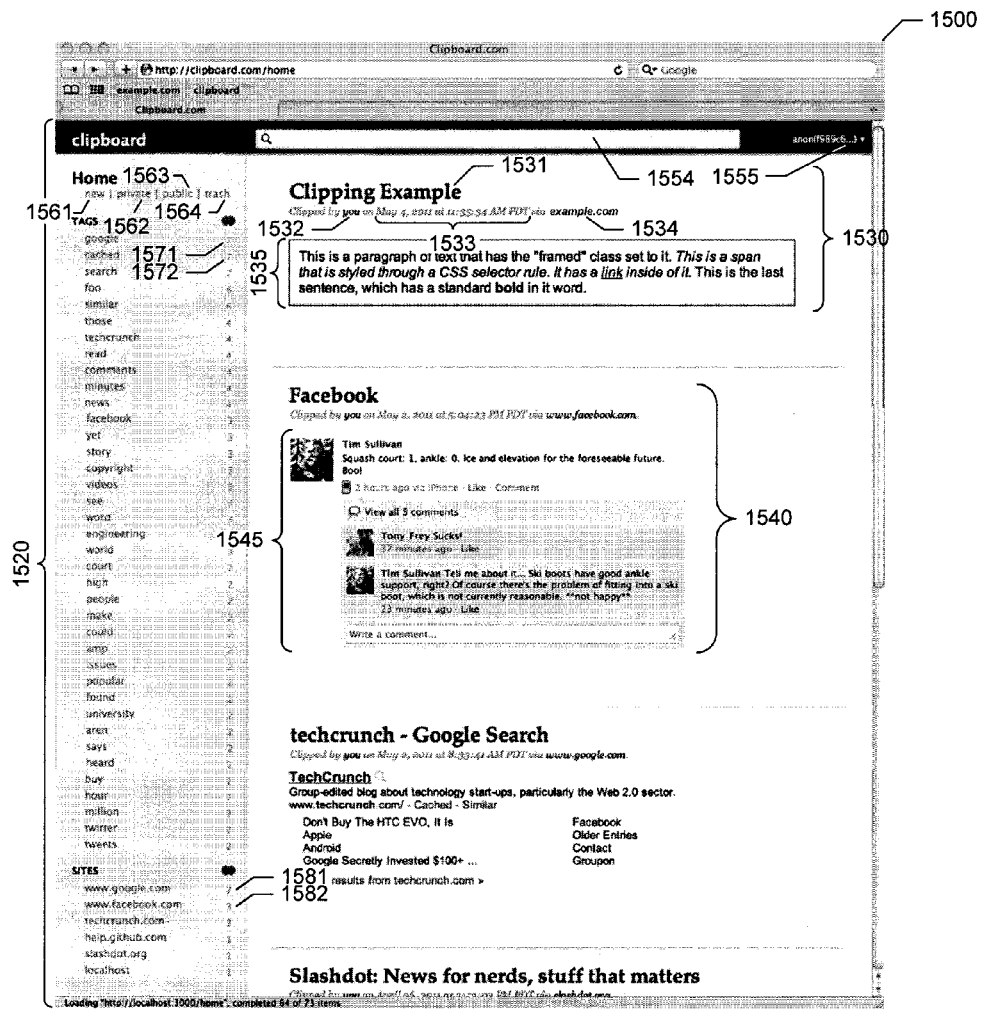
FIG. 15 is a display diagram showing a sample display presented by the facility containing the portion destination page for the user.

FIG. 15 is a display diagram showing a sample display presented by the facility in some embodiments containing the portion destination page for the user. Browser window 1500 includes a client area 1520 in which is displayed a rendered version of the destination page. The destination page includes multiple portion entries each containing one portion extracted from a web page by the user, such as portion entries 1530 and 1540. As shown, each portion entry includes the portion itself (portion 1535 in entry 1530, portion 1545 in entry 1540), as well as additional information about the portion. For example, in addition to portion 1535, portion entry 1530 includes a title 1531 of the page from which the portion is extracted, and indication 1532 of the user who extracted the portion; the date and time 1533 at which the portion is extracted; and the domain 1534 of the web page from which the portion is extracted. In some embodiments, the destination page contains a portion entry for every portion ever extracted by the user. The destination page also includes numerous filtering controls, such as filtering controls 1561-1564 for omitting the portion entries to those that correspond, respectively, to recently-extracted portions; portions marked private; portions marked public; and deleted portions. The destination page also includes filtering controls 1571-1572 for different tags attributing in various ways to each portion, web page, web site, or group of web sites from which the portion was extracted, etc. The destination page also includes filtering controls such as filtering controls 1581-1582 for displaying only those portion entries corresponding to portions extracted from particular websites or domains. The destination page also includes a search field 1554 into which the user can type a search query. In response, the facility filters the displayed portions to those that satisfy the query, such as those that contain text matching the query. The destination page also includes a log out control 1555 that the user can activate in order to log out from the facility, or back in. Those skilled in the art will appreciate that various other user interface techniques can be applied to the layout in an operation of the destination page in various embodiments.

In some embodiments, the facility enables the user to select multiple subtrees within the page for extraction, such as by using user interface techniques such as click-and-drag and shift-click. In such embodiments, the facility constructs multiple copy subtrees, each corresponding to one of the subtree selected in the original, as children of the reset node. In some embodiments, the facility reestablishes and rescores the list of nodes in the page when the page is reflowed by the browser, or when new content streams into the page.

In some embodiments, the facility performs additional analysis to identify nodes in the destination subtree having a particular type to which the facility has assigned or would assign the same inline attributes and values. In these embodiments, the facility establishes a special class for nodes of this type that express these attribute values, so that the inline attributes can be removed from the nodes themselves.

In some embodiments, the facility performs additional analysis to identify outermost layout attributes of the source subtree that are superfluous in the destination subtree. For example, the source subtree may have a large right margin value to make sure that it is visually separated from another part of the source document that is not present in the extracted portion. In this case, the large margin in the source subtree can be reduced or eliminated in the destination subtree.

In some embodiments, the facility enables the author of a page to code the source for the page in a manner that directs aspects of the facility's extraction of portions from the page. In some embodiments, the author of a page is able to explicitly designate which nodes in the page are eligible for extraction. For example, for a recipe page in which each recipe is presented as a stylized index card, the author may wish to designate as candidates for extraction only those nodes corresponding to a whole index card to better preserve the fidelity of portions extracted from this page. In some embodiments, the author performs this explicit designation by attaching a special class to only those nodes that are to be eligible for extraction by the facility. In the case of the sample page shown above in Table A, the author of the page would add "class=clipboard_region" inside the <p> open tags that occur on lines 21, 23, and 31 to limit the facility to extracting only any of the entire paragraphs, rather than nodes corresponding to only a portion of a paragraph.

In some embodiments, the author of a page is able to code a page in a way that specifies metadata to be associated with portions extracted from the page by the facility. For example, the author of a page might wish to ensure that portions extracted from the page have a metadata attribute associated with them that identifies the subject matter category to which the portion relates. This subject matter category can then be used by the facility in the destination page in order to select, subset, sort, etc. extracted portions based upon their subject matter category. As one example, the author of a cinema page may wish to associate the category "movies" with the page as a whole, and more specific categories such as "movies—horror", "movies—documentary", etc. with sections of the page directed to individual movies that fall into those categories. In some embodiments, in order to do so, the author adds the inline attribute "clipboard_category='movies'" to the body tag for the page, adds the inline attribute "clipboard_category='movies—horror'" to the open tag for a node that the author wishes to have this more specific category, etc. The facility, in generating an extracted portion, copies these specialized metadata attributes to the extracted portion along with formatting attributes. Also, in some embodiments, the presence of any of these metadata attributes in an extracted portion causes the facility to add the metadata attribute and its value to the portion table entry for the portion (not shown), enabling the facility to more easily use this additional metadata to select, sort, subset, etc. the extracted portions represented in the portion table. In various embodiments, the author is able to specify values for various metadata attributes in this way, in some cases metadata attributes that are arbitrarily selected by the author.

It will be appreciated by those skilled in the art that the above-described facility may be straightforwardly adapted or extended in various ways. For example, in a variety of embodiments, the facility is capable of extracting portions from documents other than html documents, including both documents in other tag languages and non-tag language documents. In various embodiments, the facility uses a variety of techniques to enable the user to select one or more portions to be extracted, and a variety of techniques to make extracted portions available and usable to this user and/or other users. While the foregoing description makes reference to particular embodiments, the scope of the invention is defined solely by the claims that follow and the elements recited therein.

I claim:

1. A method caused to be performed by at least one computing system having a processor, the method comprising:
   generating a list of nodes in a rendered version of a subject web page, each node having a respective location score having a value identical to other location scores of each node in the list;
   determining a location of a pointer displayed in relation to the rendered version of the subject web page according to scrolling adjusted coordinates of the displayed pointer, the location indicating a first node of the list of nodes, the first node having a first location score reduced by a factor;
   for each node of the list of nodes, updating the respective location score, the updated respective location score for each node having an updated value based on a distance of the pointer from a corner associated with the node and a square root of an area of the node;
   identifying, based on a lowest updated value of the updated location scores, a portion of the rendered version of the subject web page corresponding to at least one subtree of a document object model tree created for the subject web page;
   establishing in the document object model tree a reset node comprising a stylesheet specifying a predetermined standardized set of formatting attribute values inheritable by descendents of the reset node;
   for each subtree of the document object model tree created for the subject web page to which the identified first node of the rendered version of the subject web page corresponds:
   traversing the subtree;
   for each node of the subtree visited during the traversal:
   establishing a corresponding node as a descendent of the reset node, the established corresponding node having a type matching a type of the node of the subtree;
   where the node of the subtree has calculated values for any of a plurality of formatting attributes, for each of the plurality of formatting attributes:
   determining a calculated value of the formatting attribute in the node of the subtree;
   determining a calculated value of the formatting attribute in the corresponding node, the determined calculated value of the formatting attribute in the corresponding node being inherited from the predetermined standardized set of formatting attribute values;
   determining that the calculated values differ; and
   only when it is determined that calculated values differ, explicitly specifying for the corresponding node the determined calculated value of the formatting attribute in the node of the subtree.

2. The method of claim 1, further comprising transforming a subtree of the document object model tree defined by the reset node or a descendent of the reset node into a tag language representation.

3. The method of claim 2 wherein the tag language representation into which the subtree is transformed is an HTML representation.

4. The method of claim 1, further comprising storing a representation of a subtree of the document object model tree defined by the reset node or a descendent of the reset node on a server.

5. The method of claim 1, further comprising generating a destination web page containing the established corresponding nodes.

6. The method of claim 1, wherein the act of receiving user input comprises:
for each of a plurality of selectable nodes of the document object model tree, determining a location and size of the node in the rendered version of the subject web page;
receiving a mouse cursor location; and
selecting one of the plurality of selectable nodes based upon the size determined for the node in the rendered version of the subject web page and location of the mouse cursor relative to the location determined for the node in the rendered version of the subject web page.

7. The method of claim 6, wherein the selecting comprises selecting from among the nodes containing the location of the mouse cursor the node.

8. The method of claim 6, further comprising limiting the plurality of selectable nodes to include only nodes explicitly designated within the subject web page as selectable nodes.

9. The method of claim 1, wherein the reset node is at a same level of a hierarchy of nodes of the document object model tree as a highest node of the subtrees.

10. A computer-readable storage medium having contents configured to cause a computing system to perform a method for extracting a portion of a selected hierarchical document, the selected hierarchical document comprised of nodes in an arrangement in which a node may be a descendent of another node, each node having a type, a node and all of its descendent nodes collectively constituting a subtree of the document hierarchy, the method comprising:
generating a list of nodes in a rendered version of a subject web page, each node having a respective location score having a value identical to other location scores of each node in the list;
determining a location of a pointer displayed in relation to the rendered version of the subject web page according to scrolling adjusted coordinates of the displayed pointer, the location indicating a first node of the list of nodes, the first node having a first location score reduced by a factor;
for each node of the list of nodes, updating the respective location score, the updated respective location score for each node having an updated value based on a distance of the pointer from a corner associated with the node and a square root of an area of the node;
selecting, based on a lowest updated value of the updated respective locations, one of the nodes of the document hierarchy as the root of a subtree of the document hierarchy that corresponds to the portion to be extracted;
establishing a reset node comprising a stylesheet specifying a predetermined standardized set of formatting attribute values inheritable by descendents of the reset node;
for each of one or more of the nodes of the subtree defined by the selected node of the document hierarchy:
establishing a descendent of the reset node having the same type as the node of the subtree;
for each of a plurality of formatting attributes, determining calculated values of the formatting attributes in both the descendent of the reset node and the node of the subtree, the determined calculated value of the formatting attribute in the descendant of the reset node being inherited from the predetermined standardized set of formatting attribute values;
for one or more of the plurality of formatting attributes, determining that the calculated value of the formatting attribute in the descendent of the reset node does not match the calculated value of the formatting attribute in the node of the subtree; and
for only those formatting attributes of the plurality of formatting attributes for which the determined calculated value of the formatting attribute in the descendent of the reset node does not match the determined calculated value of the formatting attribute in the node of the subtree, explicitly specifying for the formatting attribute in the descendent of the reset node the determined calculated value of the formatting attribute in the node of the subtree.

11. The computer-readable storage medium of claim 10 wherein the reset node specifies inherited formatting attribute values directly.

12. The computer-readable storage medium of claim 10 wherein the reset node specifies attribute values by attributing to the reset node a class that specifies formatting attribute values directly.

13. The computer-readable storage medium of claim 10 wherein the reset node is established in the document hierarchy of the selected hierarchical document.

14. The computer-readable storage medium of claim 10 wherein the reset node is established in the document hierarchy of a hierarchical document other than the selected hierarchical document.

15. The computer-readable storage medium of claim 10, further comprising causing a representation of the nodes descending from the reset node to be persistently stored.

16. The computer-readable storage medium of claim 10, further comprising generating a web page that is distinct from the selected hierarchical document that contains a representation of the nodes descending from the reset node.

17. The computer-readable storage medium of claim 10, further comprising generating a hierarchical document other than the selected hierarchical document that contains a representation of the nodes descending from the reset node.

18. The computer-readable storage medium of claim 17 wherein the acts of claim 15 are repeated for a second selected hierarchical document to produce a second set of reset node descendents,
and wherein the generated hierarchical document also contains a representation of the second set of reset node descendents.

19. The computer-readable storage medium of claim 18 wherein both occurrences of the receiving act receive user input from the same user.

20. The computer-readable storage medium of claim 10, further comprising performing the explicitly specifying for a metadata attribute of at least one node of the subtree.

21. A method for extracting a portion of a selected hierarchical document, the selected hierarchical document comprised of nodes in an arrangement in which a node may be a descendent of another node, each node having a type, a node and all of its descendent nodes collectively constituting a subtree of the document hierarchy, the method comprising:
generating a list of nodes in a rendered version of a subject web page, each node having a respective location score having a value identical to other location scores of each node in the list;

determining a location of a pointer displayed in relation to the rendered version of the subject web page according to scrolling adjusted coordinates of the displayed pointer, the location indicating a first node of the list of nodes, the first node having a first location score reduced by a factor;

for each node of the list of nodes, updating the respective location score, the updated respective location score for each node having an updated value based on a distance of the pointer from a corner associated with the node and a square root of an area of the node;

selecting, based on a lowest updated value of the updated respective locations, one of the nodes of the document hierarchy as the root of a subtree of the document hierarchy that corresponds to the portion to be extracted;

establishing a reset node comprising a stylesheet specifying a predetermined standardized set of formatting attribute values inheritable by descendents of the reset node;

for each of one or more of the nodes of the subtree defined by the selected node of the document hierarchy:

establishing a descendent of the reset node having the same type as the node of the subtree;

for each of a plurality of formatting attributes, determining the calculated value of the formatting attribute in both the descendent of the reset node and the node of the subtree, the determined calculated value of the formatting attribute in the descendant of the reset node being inherited from the predetermined standardized set of formatting attribute values;

for one or more of the plurality of formatting attributes, determining that the calculated value of the formatting attribute in the descendent of the reset node does not match the calculated value of the formatting attribute in the node of the subtree; and for only those formatting attributes of the plurality of formatting attributes for which the determined calculated value of the formatting attribute in the descendent of the reset node does not match the determined calculated value of the formatting attribute in the node of the subtree, explicitly specifying for the formatting attribute in the descendent of the reset node the determined calculated value of the formatting attribute in the node of the subtree.

22. The method of claim 21 wherein the reset node specifies inherited formatting attribute values directly.

23. The method of claim 21 wherein the reset node specifies attribute values by attributing to the reset node a class that specifies formatting attribute values directly.

24. The method of claim 21 wherein the reset node is established in the document hierarchy of the selected hierarchical document.

25. The method of claim 21 wherein the reset node is established in the document hierarchy of a hierarchical document other than the selected hierarchical document.

26. The method of claim 21, further comprising causing a representation of the nodes descending from the reset node to be persistently stored.

27. The method of claim 21, further comprising generating a web page that is distinct from the selected hierarchical document that contains a representation of the nodes descending from the reset node.

28. The method of claim 21, further comprising generating a hierarchical document other than the selected hierarchical document that contains a representation of the nodes descending from the reset node.

29. The method of claim 28 wherein the acts of claim 26 are repeated for a second selected hierarchical document to produce a second set of reset node descendents, and wherein the generated hierarchical document also contains a representation of the second set of reset node descendents.

30. The method of claim 29 wherein both occurrences of the receiving act receive user input from the same user.

31. The method of claim 21, further comprising performing the explicitly specifying for a metadata attribute of at least one node of the subtree.

* * * * *